United States Patent
Buckley et al.

(10) Patent No.: US 7,447,502 B2
(45) Date of Patent: Nov. 4, 2008

(54) SCHEME FOR PROVIDING REGULATORY COMPLIANCE IN PERFORMING NETWORK SELECTION IN A FOREIGN COUNTRY

(75) Inventors: Adrian Buckley, Tracy, CA (US); Nicholas P. Alfano, Stratford-Upon-Avon (GB); Paul Carpenter, St. Margarets (GB)

(73) Assignee: Research In Motion Limited, Waterloo (CA)

( * ) Notice: Subject to any disclaimer, the term of this patent is extended or adjusted under 35 U.S.C. 154(b) by 473 days.

(21) Appl. No.: 11/035,510

(22) Filed: Jan. 14, 2005

(65) Prior Publication Data

US 2006/0160532 A1   Jul. 20, 2006

(51) Int. Cl.
*H04Q 7/20* (2006.01)
*H04Q 7/22* (2006.01)
*H04Q 7/38* (2006.01)
*H04Q 7/28* (2006.01)
*H04M 3/42* (2006.01)
*H04M 11/00* (2006.01)

(52) U.S. Cl. ..................... 455/434; 455/435.2; 370/331
(58) Field of Classification Search .............. 455/432.1, 455/435.1, 435.2, 435.3, 434, 411, 414.1, 455/433; 370/331
See application file for complete search history.

(56) References Cited

U.S. PATENT DOCUMENTS 5,983,115 A * 11/1999 Mizikovsky ................ 455/512
6,625,451 B1 * 9/2003 La Medica et al. .......... 455/434
6,643,511 B1 * 11/2003 Rune et al. .................. 455/433
6,799,038 B2 * 9/2004 Gopikanth ................ 455/435.2
7,047,008 B2 * 5/2006 Martlew .................. 455/435.2
7,167,707 B1 * 1/2007 Gazzard et al. ............. 455/434
7,184,768 B2 * 2/2007 Hind et al. ............... 455/435.3

(Continued)

FOREIGN PATENT DOCUMENTS

WO    WO 01/05174 A1    1/2001
WO    WO 2004/047480 A1    6/2004

OTHER PUBLICATIONS

European Search Report; European Patent Office; Jun. 9, 2005; 6 pages.

(Continued)

*Primary Examiner*—Lester Kincaid
*Assistant Examiner*—Nathan Mitchell
(74) *Attorney, Agent, or Firm*—Danamraj & Emanuelson, P.C.

(57) ABSTRACT

In one embodiment, a scheme for providing regulatory compliance in network selection by a user equipment (UE) device that is operable to discover an equivalent home network in a foreign country. Upon receiving a network identity code from a network node, a determination is made if the network identified by the network identity code is an equivalent home network with respect to a subscriber identity associated with the UE device. If so, network scanning is performed by the UE device in accordance with scanning procedures specified for a home country associated with the subscriber identity provided that the geographic code portion of the network country code identifies a geographic area in the home country of the subscriber identity. Otherwise, network scanning is performed by the UE device in accordance with scanning procedures specified for a foreign geographic region identified in the network identity code.

16 Claims, 7 Drawing Sheets

U.S. PATENT DOCUMENTS

2001/0027118 A1    10/2001  Sumino
2003/0119481 A1*    6/2003  Haverinen et al. .......... 455/411
2003/0204748 A1*   10/2003  Chiu .......................... 713/201
2004/0066756 A1*    4/2004  Ahmavaara et al. ......... 370/328
2004/0203745 A1*   10/2004  Cooper .................... 455/432.1
2005/0107082 A1*    5/2005  Gunaratnam et al. ........ 455/434

OTHER PUBLICATIONS

"3rd Generation Partnership Project: Technical Specification Group Core Network; NAS Functions related to Mobile Station (MS) in idle mode"; 3GPP; Technical Report; Release 7; pp. 1-34. Published Jan. 2005.

* cited by examiner

| Country/Region 350 | Geographic Region Code 352 |
|---|---|
| North America 354 | 310 311 312 314 315 316 |
| ABCD 356 | 123 124 125 |
| EFGH 358 | 510 |
| ⋮ | ⋮ |

SCHEME FOR PROVIDING REGULATORY COMPLIANCE IN PERFORMING NETWORK SELECTION IN A FOREIGN COUNTRY

FIELD OF THE DISCLOSURE

The present patent disclosure generally relates to communication networks. More particularly, and not by way of any limitation, the present patent application is directed to a scheme for providing regulatory compliance in performing network selection in a foreign country.

BACKGROUND

Wireless telephony standards such as the $3^{rd}$ Generation Partnership Project (3GPP) specifications have defined two sets of network scanning functionality for a wireless user equipment (UE) device depending on whether the device is located in its home country or not. These functions are set forth in the 3GPP Technical Specification (TS) 23.122 Non-Access Stratum (NAS) Functions Related to Mobile Station (MS) in Idle Mode, incorporated by reference herein. Additional functionality currently being developed allows an operator to define a number of networks as equivalent to a home network associated with a UE device. Certain issues such as regulatory and procedural compliance can arise, however, where the UE device attempts to obtain service in an equivalent network that is provisioned in a foreign country.

SUMMARY

In one embodiment, a scheme is disclosed for providing regulatory compliance in network selection by a wireless UE device that is operable to discover an equivalent home network in a foreign country. Upon receiving a network identity code from a network node, a determination is made if the network identified by the network identity code is an equivalent home network with respect to a subscriber identity associated with the UE device. If so, network scanning is performed by the UE device in accordance with scanning procedures specified for a home country associated with the subscriber identity, provided that the geographic code portion of the network country code identifies a geographic area in the home country of the subscriber identity. Otherwise, network scanning is performed by the UE device in accordance with scanning procedures specified for a foreign geographic region identified in the network identity code.

In one aspect, a UE device is disclosed which comprises: a communication subsystem including a transceiver module operable for receiving a network identity code from a network node of a Public Land Mobile Network (PLMN) in a location area; a logic module operable to determine if a network identified by a network identity code is an equivalent home network with respect to a subscriber identity associated with the UE device; a module, operable responsive to the determining, for performing network scanning in accordance with scanning procedures specified for a home country associated with the subscriber identity if a geographic code portion associated with the equivalent home network identifies a geographic area in the home country associated with the subscriber identity; and a module for performing network scanning in accordance with scanning procedures specified for a foreign geographic region identified in the network identity code, if the geographic code portion associated with the equivalent home network does not identify a geographic area in the home country.

In a further aspect, a network selection method is disclosed which comprises: receiving, by a UE device in a location area, a network identity code from a network node; determining if a network identified by the network identity code is an equivalent home network with respect to a subscriber identity associated with the UE device; responsive to the determining, performing network scanning by the UE device in accordance with scanning procedures specified for a home country associated with the subscriber identity if a geographic code portion associated with the equivalent home network identifies a geographic area in the home country associated with the subscriber identity; and otherwise, performing network scanning by the UE device in accordance with scanning procedures specified for a foreign geographic region identified in the network identity code.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
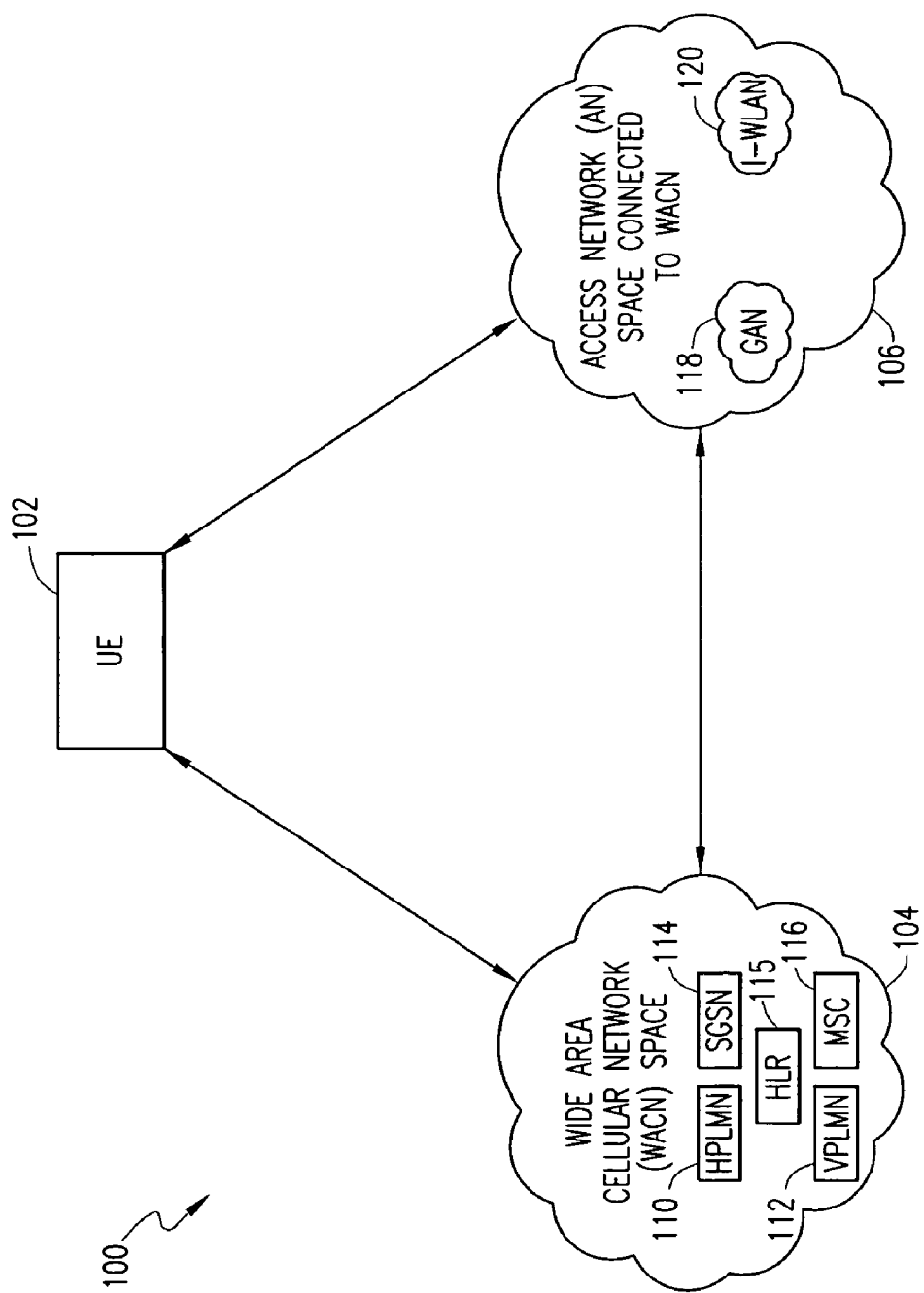
FIG. 1 depicts a generalized network environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein an embodiment of the present patent disclosure may be practiced. A user equipment (UE) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands. For example, UE device 102 may operate in the cellular telephony band frequencies as well as wireless Local Area Network (WLAN) bands. Further, other bands in which the UE device could operate wirelessly may comprise Wi-Max bands or one or more satellite bands. By way of illustration, the network environment 100 is comprised of two broad categories of communication spaces capable of providing service to UE device 102 wherein access to a Public Land Mobile Network (PLMN) may be accomplished in accordance with the teachings set forth herein. In wide area cellular network (WACN) space 104, there may exist any number of PLMNs that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise networks selected from the group consisting of an Enhanced Data Rates for GSM Evolution (EDGE) network, an Integrated Digital Enhanced Network (IDEN), a Code Division Multiple Access (CDMA) network, a Time Division Multiple Access (TDMA) network, a Universal Mobile Telecommunications System (UMTS) network, or any $3^{rd}$ Generation Partnership Project (3GPP)-compliant network (e.g., 3GPP or 3GPP2), all operating with well known frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard.

In one embodiment, interfacing between the WACN and AN spaces may be effectuated in accordance with certain standards. For instance, GAN 118 may be interfaced with one or more PLMNs using the procedures set forth in the 3GPP TR 43.901 and 3GPP TS 43.xxx documents as well as related documentation. Likewise, WLAN 120 may interfaced with at least one PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement. For purposes of the present patent disclosure, these standards are incorporated by reference where applicable.

It should further be realized that any portion of the network environment 100, either the WACN space 104, the AN space 106, or both, may include a location area that is outside the home country or region associated with the subscriber of the UE device. As set forth in 3GPP TS 23.122, two sets of network scanning functionality are defined for the UE device 102. One set of network scanning procedures are applicable when the UE device 102 is located within its home country or home region. On the other hand, a second set of network scanning procedures are provided when the UE device 102 is not in its home country. Accordingly, depending on where the location area is, the UE device 102 is operable to execute appropriate scanning procedures even when an EHPLMN is discovered in a foreign country, as will be described in detail hereinbelow.

Figure 2:
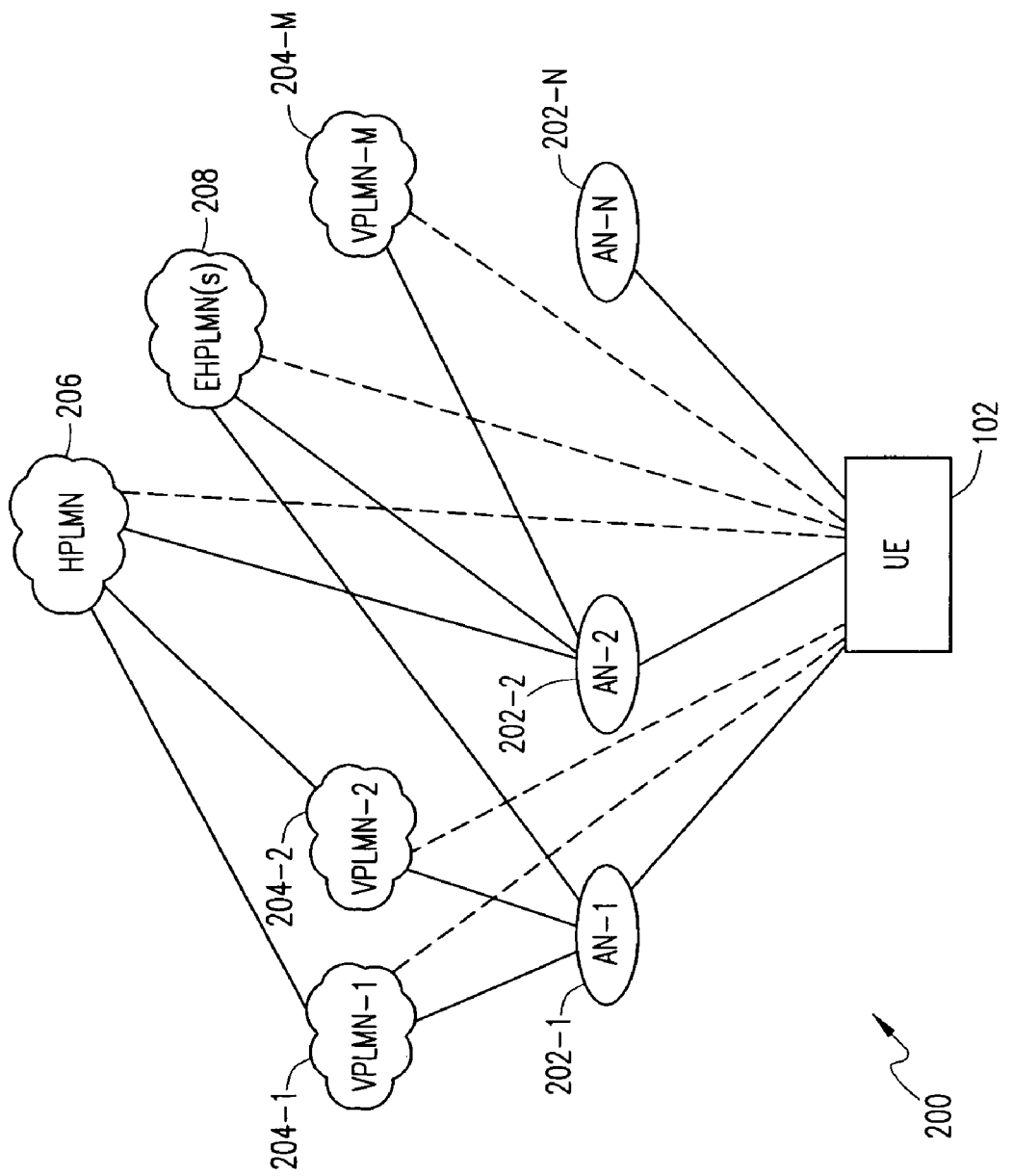
FIG. 2 depicts an exemplary embodiment of a network environment where a wireless UE device is operably disposed for network discovery and selection in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, wireless UE device 102 is operably disposed for discovering a set of PLMNs that allow access via conventional radio access network (RAN) infrastructure in addition to having connectivity with one or more ANs accessible to UE device 102. By way of example, AN-1 202-1 through AN-N 202-N, which are now generalized for purposes of the present patent disclosure to include any type of GAN, WLAN and/or I-WLAN arrangements (known or heretofore unknown), are operable to provide access to one or more PLMNs once discovered by the UE device. As illustrated, a wireless AN may support connectivity to one or more PLMNs, or none at all, which can include VPLMNs 204-1 through 204-M as well as HPLMNs (e.g., HPLMN 206) and one or more EHPLMNs 208 with respect to UE device 102. Where AN-PLMN connectivity is supported, which PLMNs behind a particular AN are visible to UE device 102 may depend on a number of commercial factors, e.g., contractual arrangements between AN operators and PLMN operators. By way of illustration, AN-1 202-1 supports connectivity to VPLMN-1 204-1, VPLMN-204-2, and EHPLMN(s) 208. Likewise, AN-2 202-1 supports connectivity to VPLMN-M 204-M as well as to HPLMN 206 and EHPLMN(s) 208. On the other hand, AN-N 202-N has no connectivity to the wide area PLMNs. Furthermore, in addition to being able to discover the various PLMNs via a wireless AN, UE 102 is also operable to scan the cellular bands to discover the PLMNs directly. Regardless of how the PLMNs are discovered, at any rate, one or more of the VPLMNs and/or EHPLMNs may be located outside the home country of the UE device 102.

As is well known, each of the wide area cellular PLMNs may be arranged as a number of cells, with each cell having sectors (e.g., typically three 120-degree sectors per base station (BS) or cell). Each individual cell is provided with a Cell Global Identification (CGI) parameter to identify them. A group of cells is commonly designated as a Location Area (LA) and may be identified by an LA Identifier (LAI). At the macro level, the PLMNs may be identified in accordance with the underlying cellular technology. For example, GSM-based PLMNs may be identified by an identifier comprised of a Mobile Country Code (MCC) and Mobile Network Code (MNC). The CDMA/TDMA-based PLMNs may be identified by a System Identification (SID) parameter and/or a Network Identification (NID) parameter. Irrespective of the cellular infrastructure, all cells broadcast the macro level PLMN identifiers (i.e., network identity codes) such that a wireless device (e.g., UE device 102) wishing to obtain service can identify the wireless network as well as its geographic location.

Additionally, a subscriber is also given a unique identifier which can vary depending on the underlying cellular infrastructure and may be constructed at least in part from some of the parametrics that are used in constructing the network identifiers. In GSM, for example, an International Mobile Subscriber Identity (IMSI) parameter uniquely identifies the subscriber and is constructed as [MCC][MNC][MIN], where [MCC] identifies the country that the subscriber is from (i.e., the subscriber's home country/region), [MNC] identifies the PLMN network, and [MIN] is the unique ID that identifies the mobile unit (i.e., the UE wireless device) within the network. In some situations, a single country or geographic region (e.g., North America) may have multiple country codes (i.e., MCCs) assigned to it, although the entire region is regulated by the same scanning functionality requirements (i.e., a common set of scanning procedures).

Figure 3A:
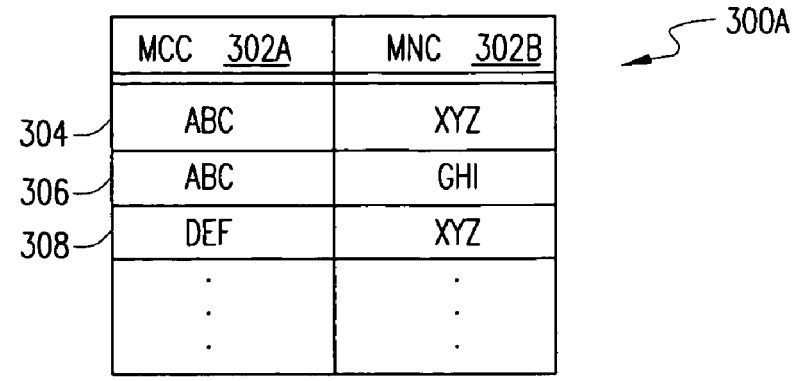
FIGS. 3A-3C depict exemplary database structures which may be provided with a UE device in accordance with the teachings of the present patent disclosure.
Figure 3B:
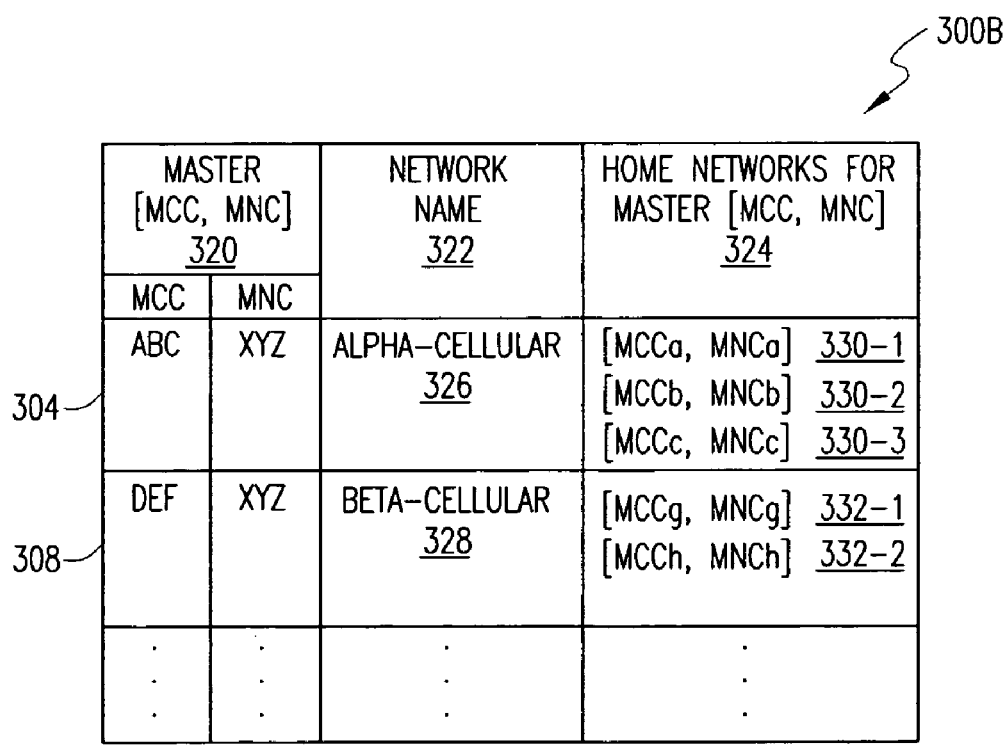
Figure 3C:

For purposes of illustration, the embodiments of the present patent disclosure will be particularly exemplified in reference to GSM networks, although it should be appreciated that the teachings set forth herein may be applied mutatis mutandis in other cellular networks as well. FIGS. 3A-3C depict exemplary database structures which may be provided with a UE device for facilitating network selection and regulatory compliance in accordance with one embodiment. Reference numeral 300A refers to a basic database structure that comprises a list of [MCC] 302A and [MNC] 302B combinations that may be identified as being the same networks. In the case of equivalent networks, the [MCC][MNC] combinations may identify a set of EHPLMNs (foreign or otherwise) for the IMSI associated with the subscriber. Reference numerals 304, 306 and 308 refer to three exemplary networks, wherein networks 304 and 306 share the same [MCC], i.e., [ABC], and networks 304 and 308 share the same [MNC] (i.e., [XYZ]). In one exemplary embodiment, the data structure 300A may be stored as an elementary file (EF) structure on a Subscriber Identity Module (SIM) card or Removable User Identity Module (RUIM) card operable with a wireless UE device. In another embodiment, the data structure 300A could be stored in a memory module integrated with the wireless UE device.

Reference numeral 300B refers to an enhanced database structure where additional information may be provided for facilitating network selection. A Master [MCC][MNC] column 320 identifies the [MCC] and [MNC] combinations that match the IMSI's [MCC]/[MNC] part (i.e., Master Home PLMN). A network name column 322 identifies the master network by name. A home network (EHPLMN) column 324 includes a list of home networks for each of the Master [MCC][MNC] pairs. In one implementation, the [MCC][MNC] combinations identifying the home networks may be provided in a priority order. For example, a positional priority may be implemented wherein an [MCC][MNC] combination at the top has a higher priority over the one below it, or an [MCC][MNC] combination to the left has a higher priority over the one to the right. An explicit priority ranking may also be provided wherein an indicator indicating the priority of the PLMN is appended to the database structure 300B. For instance, a value of [0] may indicate the highest priority. Where there is no priority indicator stored, all PLMNs have equal priority. Additionally, although not shown in FIG. 3B, an indicium column may also be provided for uniquely identifying each PLMN listed in the home network list 324, wherein the indicium may comprise a unique identity name that can include some reference to the Master [MCC][MNC] pair or the network name associated therewith.

Referring now to FIG. 3C, a data structure 300C includes a mapping relationship between various geographic entities 350 (i.e., individual countries and supra-national geographic regions such as North America, the European Economic Community, et cetera) and geographic region codes 352 associated therewith. In a presently preferred exemplary embodiment, where a region/country has multiple country codes assigned to it, they are stored in such a way that all of them are associated with or otherwise mapped to the single geographic entity, which typically operates under a common mobile communications regulatory regime. It should be appreciated by one skilled in the art that this arrangement allows the wireless UE device to determine what country it is in when examining the country code of a PLMN it is receiving service from. By way of example, there are seven [MCC] values, 310 to 316, assigned to North America 354. Another exemplary entity, a single country ABCD 356, may also be provided with multiple [MCC] values, e.g., from 123 to 125. In another example, a geographic entity EFGH 358 is assigned only one [MCC], e.g., 510. As alluded to before, the data structure 300C may be provided as part of a storage module integrated with the wireless UE device.

In one implementation, the wireless UE device is operable upon power-up to determine the capability of the SIM/RUIM card that has been inserted into it. If the wireless device discovers that the SIM/RUIM card contains a list of EHPLMNs, the device uses the list for subsequent network selection operations. If the SIM/RUIM card does not contain a list of PLMNs, the wireless device is operable to read the IMSI of the subscriber. Thereafter, if the wireless device is provided with stored home network lists in its memory for the [MCC][MNC] pairs of the IMSI, the stored PLMN database may then be used to find the list of HPLMNs associated with a particular IMSI. Otherwise, the wireless UE device is operable to perform network discovery procedures as currently specified.

Figure 4:
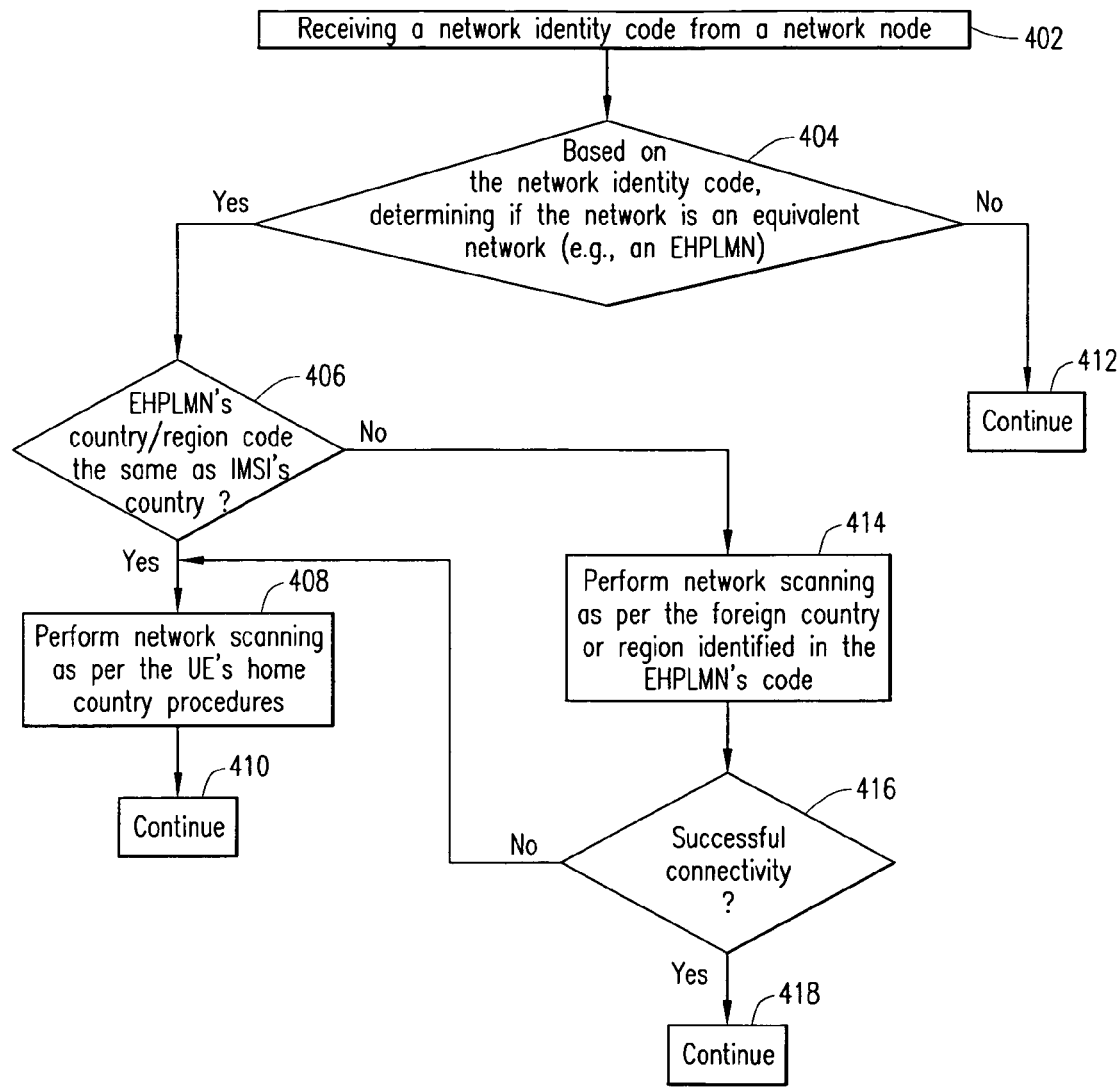
FIG. 4 depicts a flowchart of an embodiment of a network selection method.

FIG. 4 depicts a flowchart of an embodiment of a network selection method wherein a foreign country may be involved. As illustrated, the wireless UE device is operable to scan in one or more frequency bands that it supports in a wideband scanning procedure to discover all available PLMNs in a location area where the device is disposed. Upon receiving a network identity code from a network node (block 402), a determination is made whether the network is an equivalent home network (e.g., EHPLMN) with respect to a subscriber identity associated with the UE device (block 404). Preferably, this determination may be performed by appropriate UE device logic for examining a stored list of MCCs such as described in detail hereinabove. If the discovered network is not a home network or its equivalent, the UE device may then proceed with applicable network procedures in a conventional manner (block 412). On the other hand, if the discovered network is an EHPLMN, a further determination is made whether the network is found to be in the same country/geographic region as the region from which the subscriber identity (e.g., IMSI) originates (block 406). This determination may be performed by examining the geographic code portion of the network identity code (e.g., the [MCC] of the [MCC,MNC] combination) and correlating it with the [MCC] of the IMSI. If the [MCC] of the equivalent home network is found to be in the same geographic region as that of the IMSI, then the UE device is operable to perform network scanning in accordance with scanning procedures specified for the home country of the subscriber identity (block 408). Thereafter, the UE device continues with network registration in a conventional manner (block 410). Otherwise, if the [MCC] of the equivalent home network is found to be in a geographic region that is different from the home country of the IMSI, i.e., a foreign geographic region, the UE device is operable to perform network scanning in accordance with the scanning procedures specified for the foreign country/region as identified in the received network identity code (block 414). Where the scanning process for the foreign country does not result in the establishment of a successful connection with the PLMN (block 416), the UE may revert to the scanning procedures specified for its home country, even though it is still located in a foreign country. Otherwise, it may continue with the foreign PLMN in a conventional manner (block 418).

As a further variation, some of the PLMNs (whether home or foreign) may be discovered by the UE via a suitable wireless AN scanning process that is effectuated in a frequency band compliant with a WLAN standard selected from the group consisting of: IEEE 802.11b standard, IEEE 802.11a standard, IEEE 802.11g standard, HiperLan standard, HiperLan II standard, Wi-Max standard, OpenAir standard, and Bluetooth standard. By way of example, where the UE is dual mode capable and when the UE finds a PLMN, it stores the network's identity (e.g., [MCC][MNC] combination) in memory or SIM or RUIM card associated with the user, until no more PLMNs can be found. As a further variation, in addition to storing the [MCC, MNC] combinations of all discovered PLMNs, the UE is capable of storing if a particular PLMN is GPRS capable or not, where such capability may be broadcast from the PLMN infrastructure. The UE is operable to perform network discovery procedures for WLAN as defined in current 3GPP TS 23.234 and 3GPP TS 24.234 specifications (incorporated by reference herein). If the WLAN finds a Service Set ID (SSID) that it knows is the HPLMN, the UE authenticates with that WLAN using the Root Network Access Identifier (NAI). Otherwise, the UE performs network discovery as specified in the 3GPP TS 23.234 and 3GPP TS 24.234 specifications. As a further variation, in addition to the SSID lists defined in the 3GPP specifications for WLAN access, extra SSID/PLMN lists and associated filtering criteria can be stored so that the UE is not only aware of the WLANs that support PLMN access, but a mechanism is provided thereby to speed up network selection as well as optimize/customize the user experience. By way of illustration, the following lists may be defined:

Operator-controlled Preferred SSIDs for WLAN access;
User-controlled SSIDs for WLAN access;
Forbidden SSIDs for WLAN access;
Operator-controlled Preferred PLMNs for WLAN access;
User-controlled PLMNs for WLAN access;
Forbidden PLMNs for WLAN access;

wherein the priority of the SSID and PLMN is dictated by its position in the list.

Figure 5:
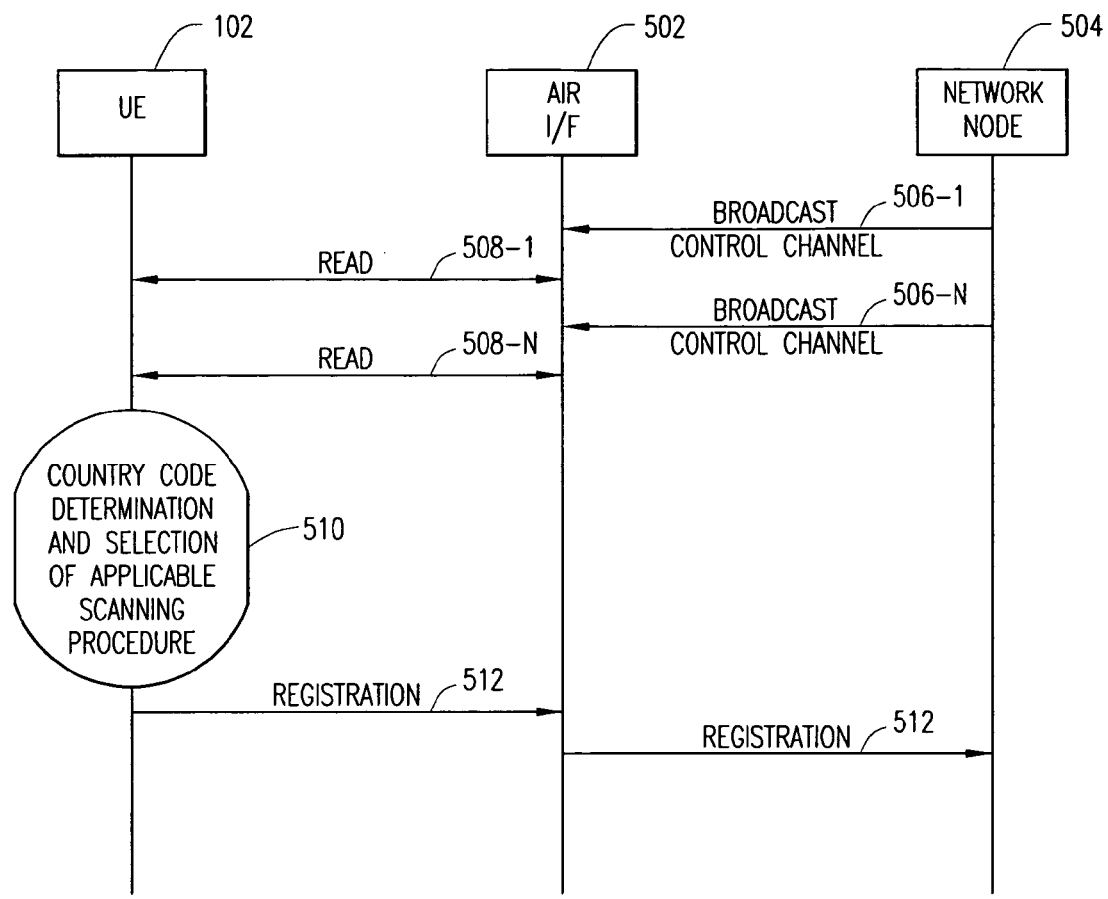
FIG. 5 depicts an exemplary message flow diagram of the present patent disclosure.

FIG. 5 depicts an exemplary message flow diagram in reference to the methodology set forth above. A network node 504 is operable to broadcast information via associated control channel over the air interface 502. In accordance with the teachings of the present patent disclosure, the network node 504 may comprise a Base Transceiver Station (BTS) node deployed in a particular cellular network. Reference numerals 506-1 through 506-N refer to the control channel messages that are broadcast by the network node 504 at a designated repetition rate. In one implementation, the broadcast information may include network identity information, capability information, adjacent cell information, among other types of information. In idle mode, UE 102 is operable to read the broadcast information over the air interface 502 and determine applicable scanning procedures (block 510) based upon the received country code and its correlation with the stored database structures. Upon determining appropriate procedures in accordance with applicable regulatory requirements, UE 102 is able to effectuate registration 512 with the network node 504.

Those skilled in the art should recognize that although the network node 504 is exemplified as a PLMN node, it is within the scope of the present disclosure to provide a WLAN node as the network node wherein appropriate scanning selection procedures as well as regulatory compliance procedures may be performed.

Figure 6:
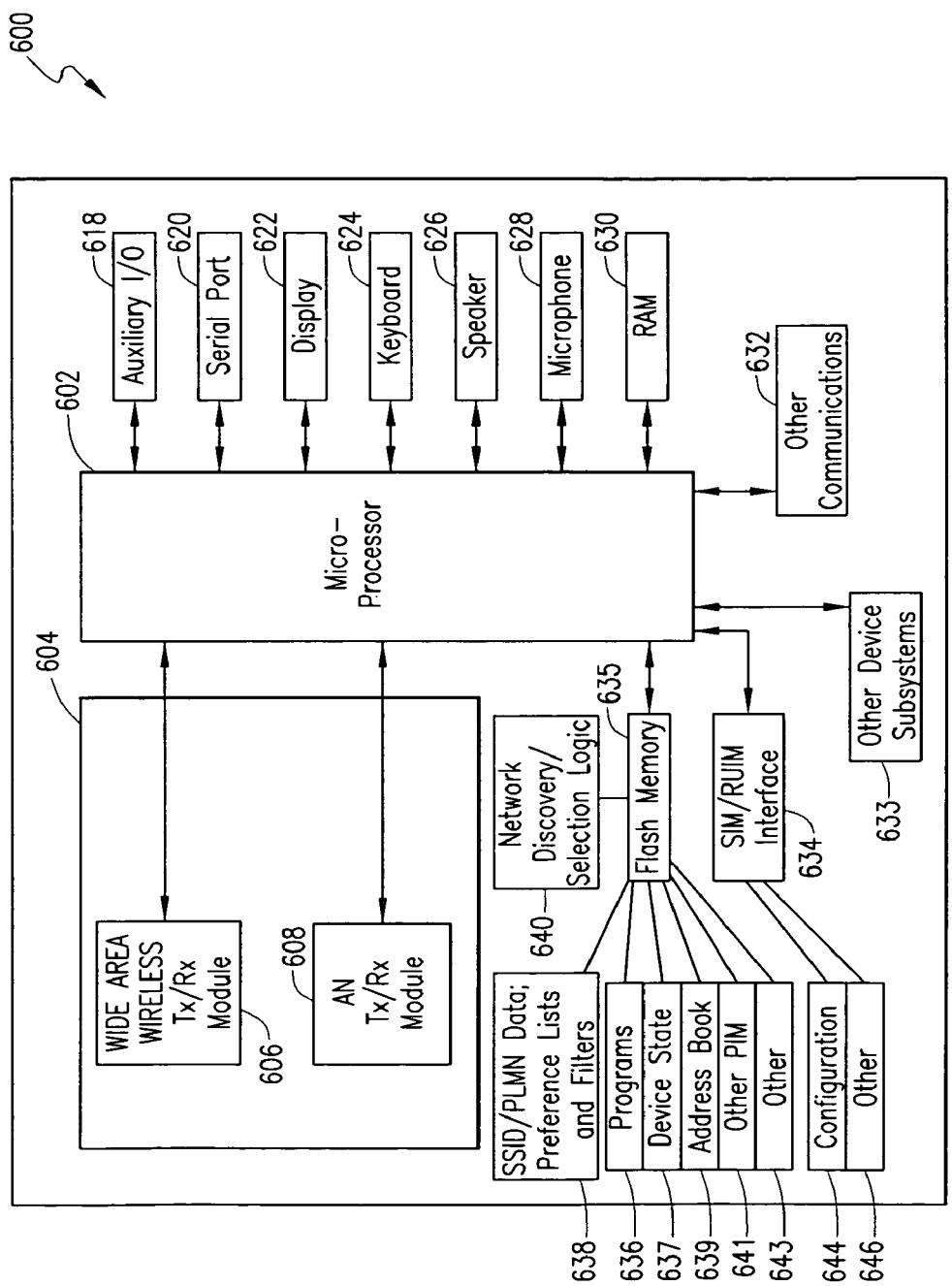
FIG. 6 depicts a block diagram of an embodiment of a UE wireless device operable to perform network selection procedures set forth according to the teachings of the present patent disclosure.

FIG. 6 depicts a block diagram of an embodiment of a UE wireless device 600 operable to perform network and scanning selection procedures set forth according to the teachings of the present patent disclosure. It will be apparent to those skilled in the art upon reference hereto that although an embodiment of UE 102 discussed above may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of UE 600 is operably coupled to a communication subsystem 604 which includes transmitter/receiver (transceiver) functionality for effectuating multi-mode communications over a plurality of bands. By way of example, a wide area wireless Tx/Rx module 606 and a wireless AN Tx/Rx module 608 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 604 may be dependent upon the communications networks with which the UE device is intended to operate. In one embodiment, the communication subsystem 604 is operable with both voice and data communications.

Microprocessor 602 also interfaces with further device subsystems such as auxiliary input/output (I/O) 618, serial port 620, display 622, keyboard 624, speaker 626, microphone 628, random access memory (RAM) 630, a short-range communications subsystem 632, and any other device subsystems generally labeled as reference numeral 633. To control access, a SIM/RUIM interface 634 is also provided in communication with the microprocessor 602. In one implementation, SIM/RUIM interface 634 is operable with a SIM/RUIM card having a number of key configurations 644 and other information 646 such as identification and subscriber-related data as well as one or more SSID/PLMN lists and filters described in detail hereinabove.

Operating system software and other control software may be embodied in a persistent storage module (i.e., non-volatile storage) such as Flash memory 635. In one implementation, Flash memory 635 may be segregated into different areas, e.g., storage area for computer programs 636 as well as data storage regions such as device state 637, address book 639, other personal information manager (PIM) data 641, and other data storage areas generally labeled as reference numeral 643. Additionally, appropriate network discovery and scanning selection logic 640 may be provided as part of the persistent storage for executing the various scanning selection procedures, correlation techniques, and related mechanisms set forth in the preceding sections. Associated therewith is a storage module 638 for storing the SSID/PLMN lists, country/geographic codes, selection/scanning filters, capability indicators, et cetera, also described in detail hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A network selection method in a user equipment(UE) device in a location area, comprising:
   receiving a network identity code;
   determining that a network identified by said network identity code is an equivalent home network with respect to a subscriber identity associated with said UE device;
   responsive to said determining, further determining whether a geographic code associated with said equivalent home network is associated with a home geographic region associated with said subscriber identity;

responsive to determining that said geographic code is associated with said home geographic region, performing network scanning in accordance with scanning procedures specified for said home geographic region associated with said subscriber identity; and responsive to determining that said geographic code is not associated with said home geographic region, performing network scanning in accordance with scanning procedures specified for a foreign geographic region identified in said network identity code.

2. The network selection method as recited in claim 1, wherein said network identity code identifies a network that comprises a Public Land Mobile Network (PLMN) selected from at least one of a General Packet Radio Service (GPRS) network, an Enhanced Data Rates for Global System for Mobile Communications (GSM) Evolution (EDGE) network, a $3^{rd}$ Generation Partnership Project (3GPP)-compliant network, an Integrated Digital Enhanced Network (IDEN), a Code Division Multiple Access (CDMA) network, a Universal Mobile Telecommunications System (UMTS) network, and a Time Division Multiple Access (TDMA) network.

3. The network selection method as recited in claim 1, wherein said network identity code comprises a combination of a Mobile Country Code (MCC) and a Mobile Network Code (MNC), said MCC depending on geographic location of a network node providing said network identity code.

4. The network selection method as recited in claim 1, further comprising:
determining if said scanning procedures specified for said foreign geographic region fail to establish connectivity with a network node providing said network identity code; and
if so, performing network scanning in accordance with said scanning procedures specified for said home geographic region.

5. The network selection method as recited in claim 1, wherein said subscriber identity comprises an International Mobile Subscriber Identity (IMSI) parameter.

6. The network selection method as recited in claim 1, wherein said receiving includes receiving said network identity code while said UE device is in idle mode.

7. The network selection method as recited in claim 1, wherein said network identity code identifies a network that comprises a wireless access network operable with a Wireless Local Area Network (WLAN) standard selected from at least one of: IEEE 802.11b standard, IEEE 802.11a standard, IEEE 802.11g standard, HiperLan standard, HiperLan II standard, Wi-Max standard, OpenAir standard, and Bluetooth standard.

8. The network selection method as recited in claim 1, wherein said network identity code comprises a System Identification (SID) parameter.

9. A user equipment (UE) device, comprising:
a logic module operable to determine if a network identified by a network identity code is an equivalent home network with respect to a subscriber identity associated with said UE device;
a logic module, operable responsive to determining that said network is an equivalent home network, for further determining whether a geographic code associated with said equivalent home network is associated with a home geographic region associated with said subscriber identity;

means for performing network scanning in accordance with scanning procedures specified for home geographic region associated with said subscriber identity, said means operating responsive to determining that said geographic code associated with said equivalent home network identifies a home geographic region associated with said subscriber identity; and means for performing network scanning in accordance with scanning procedures specified for a foreign geographic region identified in said network identity code responsive to determining that said geographic code associated with said equivalent home network does not identify a home geographic region associated with said subscriber identity.

10. The UE device as recited in claim 9, wherein said network identity code identifies a network that comprises a Public Land Mobile Network (PLMN) selected from at least one of a General Packet Radio Service (GPRS) network, an Enhanced Data Rates for Global System for Mobile Communications (GSM) Evolution (EDGE) network, a $3^{rd}$ Generation Partnership Project (3GPP)-compliant network, an Integrated Digital Enhanced Network (IDEN), a Code Division Multiple Access (CDMA) network, a Universal Mobile Telecommunications System (UMTS) network, and a Time Division Multiple Access (TDMA) network.

11. The UE device as recited in claim 9, wherein said network identity code comprises a combination of a Mobile Country Code (MCC) and a Mobile Network Code (MNC), said MCC depending on geographic location of a network node providing said network identity code.

12. The UE device as recited in claim 9, further comprising:
a logic module for determining if said scanning procedures specified for said foreign geographic region fail to establish connectivity with a network node providing said network identity code; and
means, operable responsive to said determining that said scanning procedures specified for said foreign geographic region have failed to establish said connectivity, for reverting to performing network scanning by said UE device in accordance with said scanning procedures specified for said home geographic region.

13. The UE device as recited in claim 9, wherein said subscriber identity comprises an International Mobile Subscriber Identity (IMSI) parameter.

14. The UE device as recited in claim 9, further comprising means, operable upon determining that said network identified by said network identity code is not an equivalent home network with respect to said subscriber identity, for performing scanning procedures specified for a geographic region identified in said network identity code.

15. The UE device as recited in claim 9, further comprising a transceiver module operable for scanning in a frequency band compliant with a wireless access network scanning process, and further wherein said network identity code identifies a network that comprises a wireless access network operable with a Wireless Local Area Network (WLAN) standard selected from at least one of: IEEE 802.11b standard, IEEE 802.11a standard, IEEE 802.11g standard, HiperLan standard, HiperLan II standard, Wi-Max standard, OpenAir standard, and Bluetooth standard.

16. The UE device as recited in claim 9, wherein said network identity code comprises a System Identification (SID) parameter.

* * * * *